(12) United States Patent
Barbir

(10) Patent No.: US 9,421,823 B2
(45) Date of Patent: Aug. 23, 2016

(54) FINAL DRIVE ASSEMBLY

(71) Applicant: Caterpillar Inc., Peoria, IL (US)

(72) Inventor: Mirko Barbir, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/570,087

(22) Filed: Dec. 15, 2014

(65) Prior Publication Data

US 2016/0167431 A1 Jun. 16, 2016

(51) Int. Cl.
*B60B 35/12* (2006.01)
*B60B 35/18* (2006.01)

(52) U.S. Cl.
CPC ............. *B60B 35/125* (2013.01); *B60B 35/18* (2013.01); *B60B 2380/14* (2013.01); *B60B 2380/73* (2013.01); *B60B 2900/111* (2013.01); *B60B 2900/112* (2013.01); *B60B 2900/114* (2013.01)

(58) Field of Classification Search
CPC ............... B60B 35/125; B60B 35/18; B60B 2900/112; B60B 2900/111; B60B 2900/114; B60B 2380/73; B60B 2380/14
See application file for complete search history.

(56) References Cited

U.S. PATENT DOCUMENTS

| | | | | |
|---|---|---|---|---|
| 3,954,026 A * | 5/1976 | Rittmann | ............ | B60B 27/0047 180/308 |
| 4,330,045 A * | 5/1982 | Myers | ................. | B60K 7/0007 180/65.51 |
| 4,359,914 A * | 11/1982 | Meisel, Jr. | ......... | B62D 49/0635 475/331 |
| 6,322,157 B1 | 11/2001 | DeWald et al. | | |
| 6,543,858 B1 | 4/2003 | Melton | | |
| 6,872,163 B2 | 3/2005 | Chung | | |
| 7,699,405 B2 | 4/2010 | Gradu et al. | | |
| 2003/0063827 A1 | 4/2003 | Webb et al. | | |
| 2004/0147361 A1* | 7/2004 | Yasuda | ............... | F16H 57/0427 475/331 |
| 2007/0181357 A1* | 8/2007 | Saito | .................... | B60K 7/0007 180/65.51 |
| 2011/0048814 A1* | 3/2011 | Thompson | ............. | B62D 11/16 180/6.7 |
| 2011/0053726 A1* | 3/2011 | Thompson | ............. | B62D 11/16 475/207 |
| 2011/0075960 A1* | 3/2011 | White | ..................... | F16C 19/30 384/606 |
| 2013/0048688 A1 | 2/2013 | Mulder | | |
| 2013/0324354 A1* | 12/2013 | Phebus | ................. | F16H 1/2818 475/348 |
| 2013/0333959 A1* | 12/2013 | Wagemann | .......... | B60K 7/0007 180/62 |
| 2014/0045635 A1* | 2/2014 | Enderle | ................... | F16H 47/04 475/59 |
| 2014/0292064 A1* | 10/2014 | Hannukalnen | ...... | B60B 35/1054 301/128 |

* cited by examiner

*Primary Examiner* — Darlene P Condra
(74) *Attorney, Agent, or Firm* — Baker & Hostetler LLP; Steve D. Lundquist

(57) ABSTRACT

A final drive includes a planetary gear assembly and at least one bearing. The at least one bearing defines an annulus having an internal space where at least a portion of the planetary gear assembly is located within the internal space. A final drive includes a planetary gear assembly, and at least one bearing, where the at least one bearing defines an annulus having an internal space, and where at least a portion of the planetary gear assembly is located within the internal space.

9 Claims, 9 Drawing Sheets

FINAL DRIVE ASSEMBLY

TECHNICAL FIELD

The disclosure is applicable to axle assemblies, and more specifically to axle assemblies having planetary gears and wheel bearings.

BACKGROUND

Axle assemblies are used in various applications to transmit power from engines to corresponding hub and tire assemblies. The axle assemblies often include many components that can be heavy and expensive to manufacture.

One example of a prior art assembly is disclosed in U.S. Pat. No. 6,322,157, which discloses a final drive that includes a spindle, hub, and a pair of bearings that are located next to a planetary gear assembly. The spindle and hub have relatively small diameters that are subjected to large external loads during operation. These external loads can create high stresses on the spindle and hub. To withstand the high stresses, it is suggested that the spindle and hub be constructed of forged components that require special heat treatment.

A drawback to the foregoing assembly is that the spindle and hub are expensive and thus, increase the overall cost of the assembly. Another drawback is that the spindle and hub are heavy and can significantly increase the overall weight of the assembly. Yet another drawback to this assembly is that the overall width of the assembly is increased due to the placement of the bearings with respect to the planetary gear assembly. Accordingly, a final drive is desired that eliminates or reduces extra cost, weight and width of the assembly.

SUMMARY

In one aspect, the disclosure describes a final drive that includes a planetary gear assembly and at least one bearing. In this aspect the at least one bearing defines an annulus having an internal space, and wherein at least a portion of the planetary gear assembly is located within the internal space.

In another aspect, the disclosure describes a final drive having a housing that includes a bore and an external surface facing opposite the bore. An axle is also included that is elongated along a horizontal direction and rotatably received within the bore. The axle is rotatable about an axis and rotatable relative to the housing. A planetary gear assembly having a ring gear mechanically coupled to the bore, a sun gear mechanically coupled to the axle, and at least one planet gear rotatably coupled to the sun gear and rotatably received by the ring gear is included such that the at least one planet gear rotates about the sun gear and rotates within the ring gear. The planetary gear assembly multiplies torque from the axle to a planet gear carrier rotatably coupled to the at least one planet gear such that the planet gear carrier rotates about the axis. At least one bearing is mechanically coupled to the external surface of the housing and a wheel is rotatably supported by the at least one bearing such that the wheel rotates about the axis.

In yet another aspect, the disclosure describes a vehicle having a final drive. The final drive includes a housing having a bore and an external surface facing opposite the bore. An axle elongated along a horizontal direction and rotatably received within the bore is included, wherein the axle defines a distal end, and wherein the axle is rotatable about an axis and rotatable relative to the housing. A planetary gear assembly is mechanically coupled to the distal end of the axle, wherein the planetary gear assembly multiplies torque from the axle to a planet gear carrier rotatably coupled to the planetary gear assembly such that the planet gear carrier rotates about the axis. A first bearing and a second bearing is included, wherein the first and second bearings are mechanically coupled to the external surface of the housing. A wheel mechanically coupled to the planet gear carrier and rotatably coupled to the first and second bearings is also included such that the wheel rotates about the axis.

DETAILED DESCRIPTION

Figure 1:
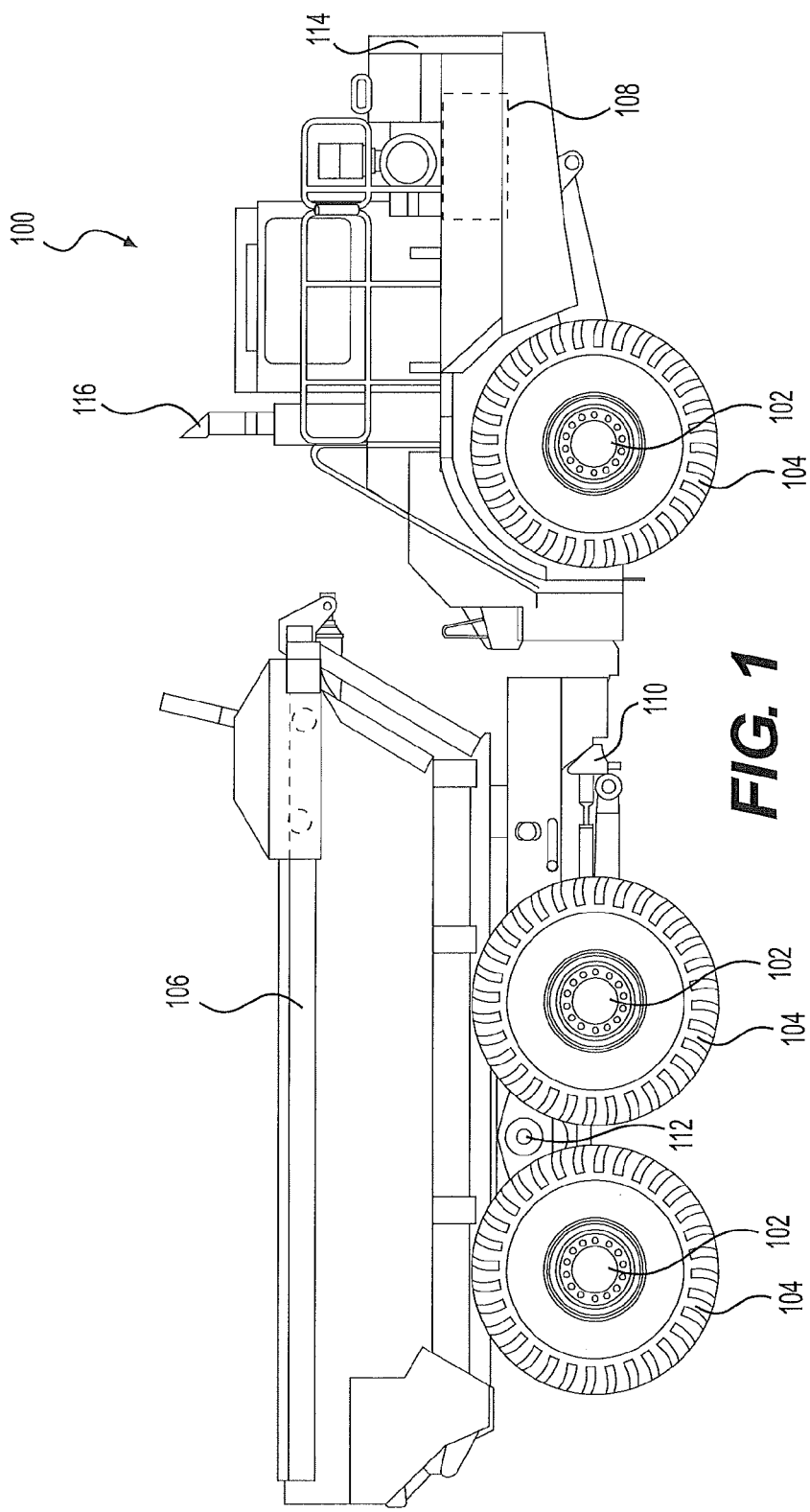
FIG. 1 is a plan view of an off-road vehicle implemented with an axle assembly according to an aspect of the disclosure.

Reference is now made to the figures wherein like reference numerals indicate like elements. In FIG. 1 there is depicted an off-road vehicle 100 implemented with one or more axle assemblies 102 according to an aspect of the disclosure. The off-road vehicle 100 may include the axle assemblies 102, ground engaging members 104, a bed 106, a combustion engine 108, a transmission 110, a suspension 112, a cooling system 114, an exhaust system 116, and the like.

Figure 2:
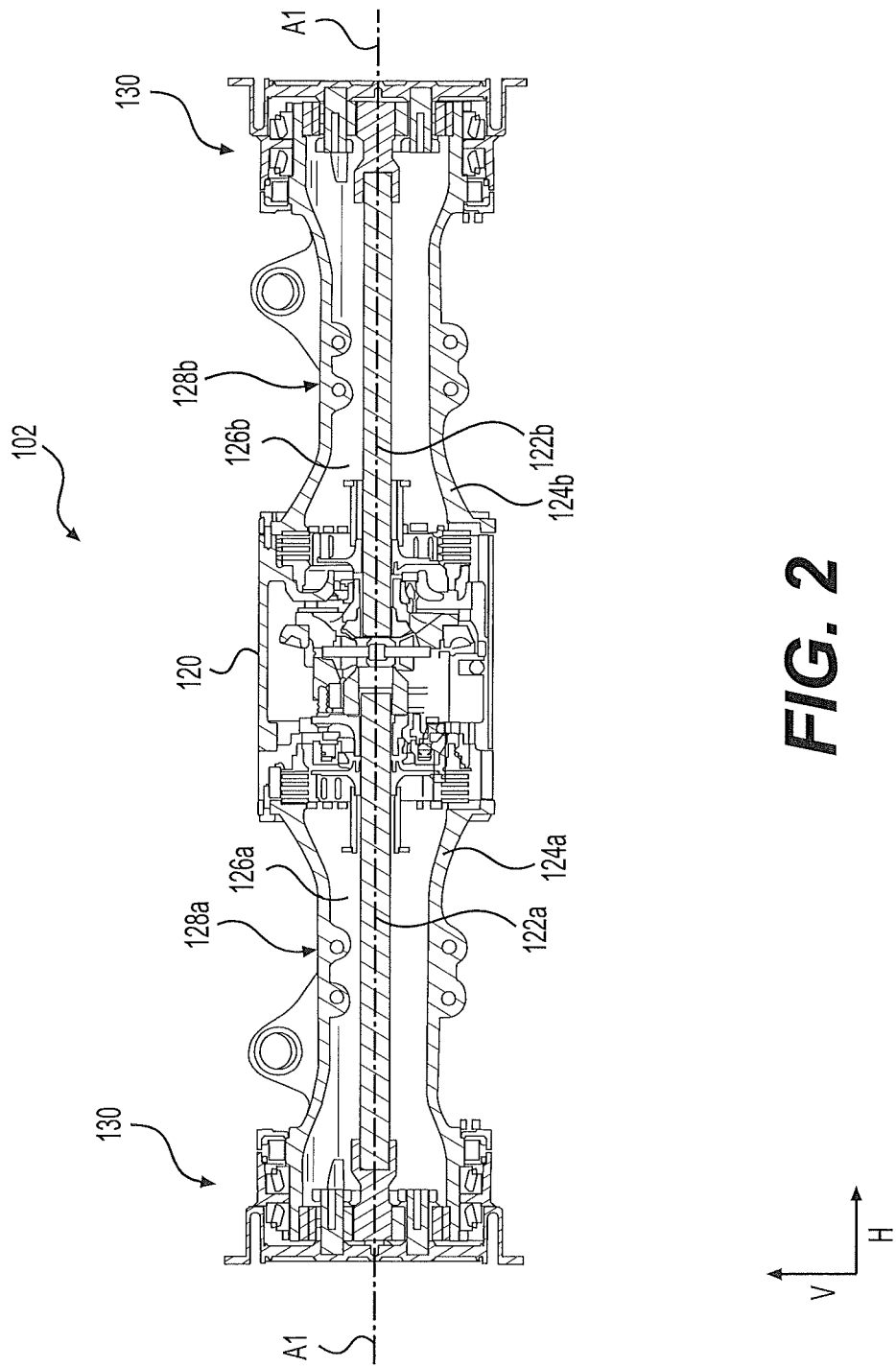
FIG. 2 is a cross-sectional view of an axle assembly according to an aspect of the disclosure.

FIG. 2 is a cross-sectional view of an axle assembly according to various aspects of the disclosure. As illustrated in FIG. 2, the axle assembly 102 may include a differential 120 that connects and drives axles 122a, 122b that are housed within respective housings 124a, 124b. The housings 124a, 124b have respective bores 126a, 126b that each have external surfaces 128a, 128b. The axles 122a, 122b may be received within the respective bores 126a, 126b and rotatable about an axis A1, as well as rotatable within respective housing 124a, 124b. Specifically, the axles 122a, 122b may rotate in a first direction or a second opposite direction. The axle assembly 102 may include respective final drives 130 that may multiply torque from the respective axles 122a, 122b to the respective ground engaging members 104 (FIG. 1), a track or other transport means that can be mechanically coupled to the respective axle assembly 102.

Figure 3:
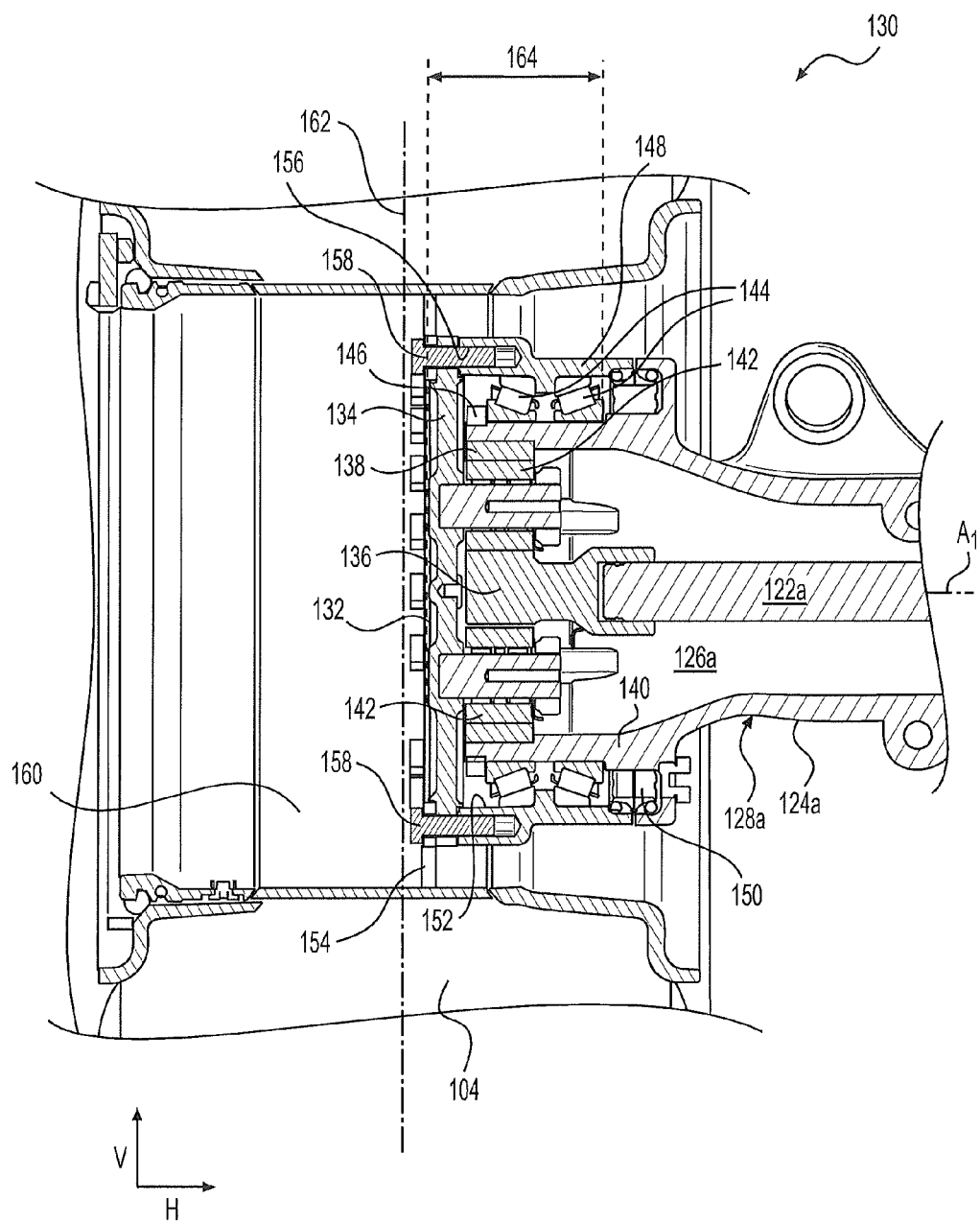
FIG. 3 is a cross-sectional view of a final drive of the axle assembly of FIG. 2.

FIG. 3 is an enlarged cross-sectional view of a final drive 130 of the axle assembly 102 of FIG. 2. Although the following description is of a single final drive 130, it will be readily recognized that, when used in an axle assembly 102, the second final drive 130 is constructed and operates in a substantially identical manner. Accordingly, the final drive 130 may include a planetary gear assembly 132 or an epicyclic gear assembly mechanically coupled to axle 122a. The planetary gear assembly 132 may multiply torque from the axle 122a to a planet gear carrier 134. In this manner, as the axle 122a rotates about the axis A1 the planet gear carrier 134 may also rotate about the respective axis A1. As well, it should be appreciated that the planet gear carrier 134 may be integral to the planetary gear assembly 132.

In order to multiply torque produced by the axle 122a, the planetary gear assembly 132 may include a sun gear 136 that is mechanically coupled to the axle 122a, and a ring gear 138 mechanically coupled to an internal surface of a wheel bearing hub 140. At least one planet gear 142, rotatably coupled to the sun gear 136 and rotatably received by the respective ring gear 138. In this manner, the at least one planet gear 142 may rotate about the outside perimeter of the respective sun gear 136 and rotate about an inside perimeter of the respective ring gear 138. Accordingly, the planetary gear assembly 132 is able to distribute loads over the at least one respective planet gear 142 and thereby transfer high torques with a compact design. It should be appreciated that the planetary gear assembly 132 may include any number of planet gears greater than one, such as two, three, four, five or more planet gears.

The person having skill in the art will appreciate that a variety of configurations can exist for the planetary gear assembly 132. Generally, it should be appreciated that any configuration capable of multiplying torque produced by the axle 122a to the respective planet gear carrier 134 may be implemented using the disclosure. As well, the person having ordinary skill in the art will appreciate that the planetary gear assembly 132 may in one aspect of the disclosure further include a planet bearing/bushing and shaft in order to allow the planet gear to freely rotate.

Further, the final drive 130 may also include one or more bearings 144 mechanically coupled to the external surface 128a of the housing 124a. By way of example, a pair of bearings having a first bearing at a first horizontal location and a second bearing at a second horizontal location spaced along the horizontal direction H. As shown in the figures, the at least one bearing 144 may be roller type bearing. However, other types of bearings are contemplated as well.

The arrangement of the at least one bearing 144 may define an annulus, or ring-shape that surrounds a portion of the housing 124a. The annulus may define an internal space whereby various components may be disposed within the internal space of the annulus. For example, at least a portion of the planetary gear assembly may be located within the internal space. The locations of the various components with respect to the at least one bearing 144 will be discussed later.

As well, the at least one bearing 144 may be horizontally fixed via a respective preload member 146 that is mechanically coupled to the external surface 128a of the housing 124a. Furthermore, the preload member 146 may be coupled adjacent to an outer surface of the first bearing, to thereby establish a horizontal load on the at least one bearing 144. It should be appreciated that the preload member 146 may be any type of loading member capable of applying and holding a horizontal load upon the at least one bearing 144.

The axle assembly 102 may also include a wheel 148 rotatably supported by the at least one bearing 144 such that the wheel 148 rotates about the axis A1. The wheel 148 may also be mechanically coupled to the planet gear carrier 134. In this manner, as the axle 122a rotates, both the planet gear carrier 134 and the respective wheel 148 will also rotate about the housing 124a. The wheel 148 may include at least one seal 150 sealably coupled to the external surface 128a of the housing 124a. In some aspects, the at least one seal 150 may be sealably coupled between the external surface 128a of the housing 124a and the internal surface 152 of the wheel 148 in order to prevent foreign particles from entering therein. It should be appreciated that the at least one seal 150 may be any type of device configured to prevent leakage, contain pressure, or exclude contamination from entering a space, such as the internal portion of the wheel 148. For example, the at least one seal 150 is shown as being a duo-cone seal face seal but in addition may be a lip seal, radial shaft seal, or the like.

Furthermore, a rim flange 154 may be mechanically coupled to both the planet gear carrier 134 and the wheel 148. For example, a bolt hole 156 may extend through the planet gear carrier 134 and into a portion of the wheel 148. In this manner, the bolt hole 156 may be configured to receive respective mechanical fastener 158, such as a bolt, which can thereby mechanically couple to the respective rim flange 154 to the planet gear carrier 134 and wheel 148. Accordingly, the planet gear carrier 134 and wheel 148 and the rim flange 154 rotate about the axis A1.

Because the final drive 130 may be implemented in a variety of machines, such as off-road vehicles or track-driven machines, it should be appreciated that in other aspects of the disclosure, the final drive 130 may also include a sprocket (not shown), in place of the rim flange 154. In this manner, the sprocket may be mechanically fastened to both the planet gear carrier 134 and/or the wheel 148. As well, the sprocket may be rotatably and operably attached to a track (not shown).

As further shown in FIG. 3, the rim flange 154 may be arranged and configured to be mechanically coupled to hub 160 and ground engaging member 104. The rotation of the axle 122a may cause the planet gear carrier 134 and wheel 148 to rotate, which thereby causes the rim flange 154, hub 160, and ground engaging member 104 to rotate.

As illustrated in FIG. 3, the hub 160 and ground engaging member 104 may define a load centerline 162 that extends perpendicular along the vertical direction V. The load centerline 162 may define a horizontal center of the respective hub 160 and respective ground engaging member 104 along the horizontal direction H. It should also be appreciated that the load centerline 162 may define a center of gravity of the hub 160 and ground engaging member 104 (i.e. the hub and tire assembly).

The load centerline 162 may be used as a reference point in describing various locations of different components of the axle assembly 102. For example, as depicted in FIG. 3, the first bearing and the second bearing may be disposed along a same horizontal side of the load centerline 162. Alternatively, through the relative location of the coupling of the rim flange 154 to the hub 160, the first and second bearings may be on either horizontal side of the load centerline 162, such as an inner horizontal side or an outer horizontal side. It should be appreciated that the terms "inner" and "outer" may describe a location with respect to the axle assembly 102. For example, the term "outer" may refer to the side of the load centerline 162 that extends away from the axle 122a along the horizontal direction H. Accordingly, the term "inner" may refer to the side of the load centerline 162 that extends towards the axle 122a, or opposite the outer side, along the horizontal direction H.

As well, the first and second bearings may be disposed on opposite horizontal sides of the load centerline 162. For example, the first bearing may be disposed on the outer horizontal side of the load centerline 162 while the second bearing may be disposed on the inner horizontal side of the load centerline 162. In some aspects, the first bearing may be disposed on the inner horizontal side of the load centerline 162 while the second bearing may be disposed on the outer horizontal side of the load centerline 162.

As well, it should be appreciated that the first and second bearings may be arranged and configured such that the load centerline 162 passes through the first bearing and/or the second bearing. In this manner, the first bearing and/or the second bearing may be disposed on both sides of the load centerline 162. Generally, it should be appreciated that any configuration of the first and second bearings may be implemented within the axle assembly 102.

It should be appreciated that the relative placement of a first and second bearing on the same or opposite sides of the centerline and the distance of those from the centerline will impact on the size of bearing needed to address the different stresses. In general, it should be appreciated that the size of the at least one bearing 144 may be dependent upon any horizontal distance from the load centerline 162. Moreover, it should be appreciated that the size of the at least one bearing 144 may be dependent upon the horizontal distance of the at least one bearing 144 from any other component of the axle assembly 102 described within this disclosure.

The size of the at least one bearing 144 may be dependent upon a vertical distance of the at least one bearing 144 from the axle 122a. However, it should be appreciated that the reference point is not limited to the axle 122a. Generally, the size of the at least one bearing 144 may be dependent upon a vertical distance of the least one bearing from any other component of the axle assembly 102 described within this disclosure.

In addition, the locations of other components of the axle assembly 102 may be described with respect to their location from the load centerline 162. For example, the axle 122a may be disposed along the same horizontal side of the load centerline 162 as the at least one bearing 144, such as the first and second bearings. As well, the axle 122a may be disposed along an opposite horizontal side of the load centerline 162 as the at least one bearing 144. It should also be appreciated that the axle 122a may be disposed on the same horizontal side of the load centerline 162 as the first bearing, while the axle 122a is disposed on the opposite horizontal side of the load centerline 162 as the second bearing. Generally speaking, any configuration of the axle assembly 102 with respect to its location in regards to the load centerline 162 and the at least one bearing 144 may be implemented.

Moreover, the locations of the planetary gear assembly 132, wheel 148, and rim flange 154 may also be described with respect to the load centerline 162 and the at least one bearing 144. For example, the planetary gear assembly 132, wheel 148, and/or rim flange 154 may be disposed along the same horizontal side of the load centerline 162 as the at least one bearing 144. As well, the planetary gear assembly 132, wheel 148, and/or rim flange 154 may be disposed along an opposite horizontal side of the load centerline 162 as the at least one bearing 144. However, it should be appreciated that the planetary gear assembly 132, wheel 148, and rim flange 154 may be arranged and configured in any suitable location with respect to the load centerline 162 and the at least one bearing 144.

In still another aspect of the disclosure, component locations may also be described with respect to a window, which is defined with respect to select components. For example, the final drive 130 may define a window 164 that extends from an outer surface of the respective planet gear carrier 134 to an inner surface of an inner bearing of the at least one bearing 144, as shown in FIG. 3. In this regard, certain components of the final drive 130 may be located with respect to the window 164. For example, the at least one bearing 144 and at least a portion of the planetary gear assembly 132 may be located within the window 164.

Accordingly, in some aspects, the entire width of the planetary gear assembly 132 is located within the window 164. However, it should be appreciated that any component of the axle assembly 102 may be located within the window 164. For example, at least a portion of the wheel 148, at least a portion of the axle 122a, and at least a portion of the mechanical fasteners 158 (when the respective mechanical fasteners 158 are threaded into the respective axle assembly 102) may be located within the window 164. Generally, it should be appreciated that any axle assembly component or combination of components may be located within the window 164.

Figure 4:
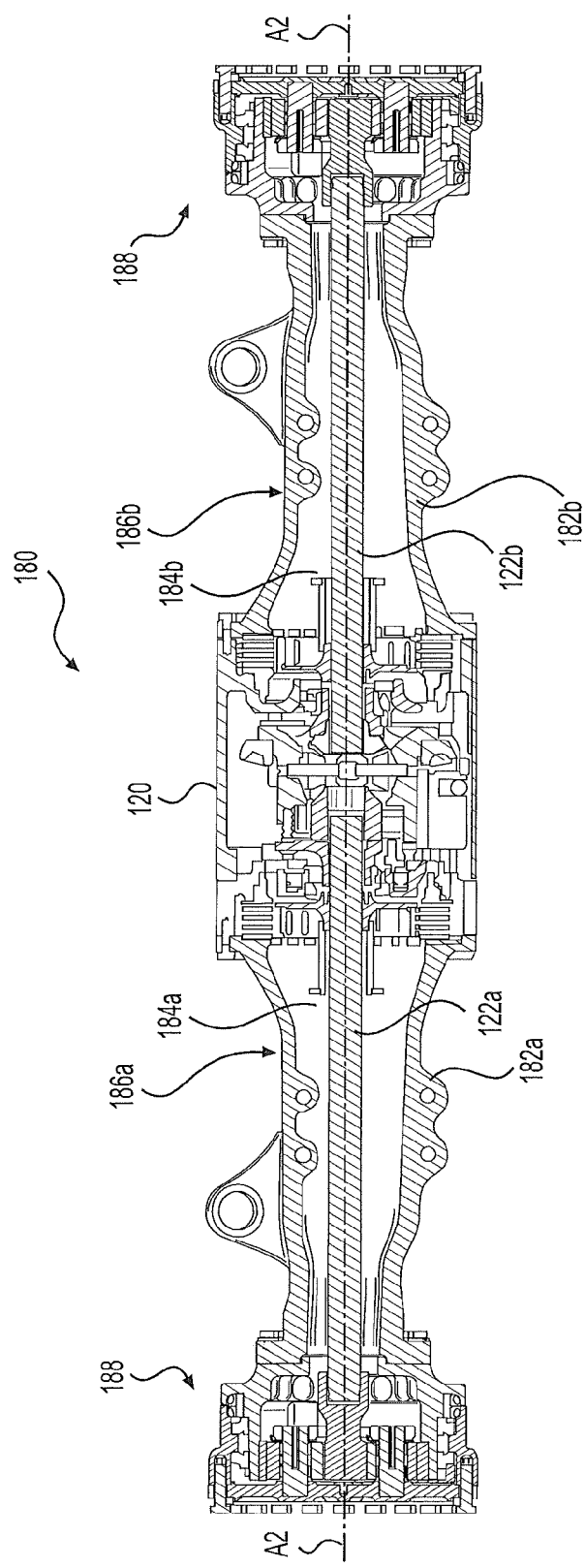
FIG. 4 is a cross-sectional view of an axle assembly according to another aspect of the disclosure.

An alternative aspect of the disclosure is provided in FIG. 4 which depicts a cross-sectional view of an axle assembly 180. As illustrated in FIG. 4, the axle assembly 180 is similar to that of FIG. 2 and includes differential 120 that connects and drives axles 122a, 122b that are housed within respective housings 182a, 182b. The housings 182a, 182b have respective bores 184a, 184b that each have external surfaces 186a, 186b facing opposite the bores 184a, 184b. The axles 122a, 122b may be received within the respective bores 184a, 184b and rotatable about an axis A2, as well as rotatable within respective housing 184a, 184b. Specifically, the axles 122a, 122b may rotate in a first direction or a second opposite direction. The axle assembly 180 may include respective final drives 188 that may multiply torque from the respective axles 122a, 122b to the respective ground engaging members 104 (FIG. 1), a track or other transport means that can be mechanically coupled to the respective axle assembly 180. The housings 182a, 182b differ from those of the axle assembly 102 of FIG. 2 primarily at the interface with the final drives.

Figure 5:
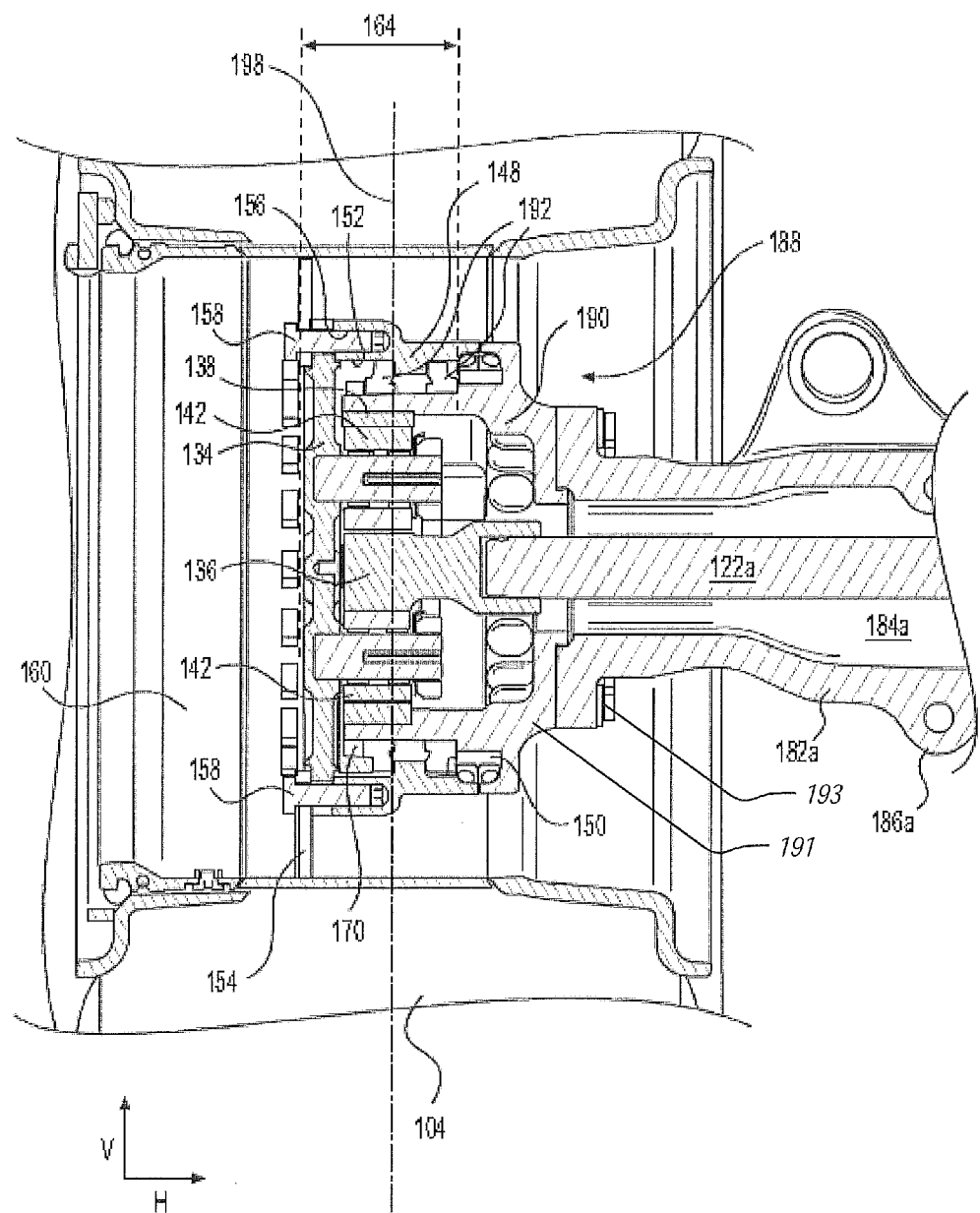
FIG. 5 is a cross-sectional view of a final drive of the axle assembly of FIG. 4.

Depicted in FIG. 5 is a cross-sectional view of a final drive 188 of the axle assembly 180 of FIG. 4. Although only one final drive 188 is described in detail herein, it will be readily recognized that, when used in an axle assembly 180, the second final drive 188 is constructed and operates in a substantially identical manner. As depicted, the final drive 188 may be integral to the housing 182a and may further include a wheel bearing hub 190, which includes a spindle flange 191. The final drive 188 may thereby be mechanically fastened to an existing housing 182a, via connecting bolts 193 or any type of mechanical fastener through the housing 182a and the spindle flange 191 of the wheel bearing hub 190. In this manner, once the wheel bearing hub 190 is mechanically fastened to the housing 182a, the wheel bearing hub 190 may serve as an extension of the housing 182a. For purposes of this disclosure, the external surface 186a of the housing 182a can also include an external surface of the wheel bearing hub 190. As well, the bore 184a can include an internal surface of the wheel bearing hub 190. In many aspects, the wheel bearing hub 190 may be integral with the housing 182a.

Further, the final drive 188 may also include at least one bearing 192 mechanically coupled to an external surface of the wheel bearing hub 190 (bearing 192) at a horizontal location. Specifically, the at least one bearing 192 may include a pair of bearings having a first bearing at a first horizontal location and a second bearing at a second horizontal location spaced along the horizontal direction H. As shown in the figures, the at least one bearing 192 may be roller type bearing. However, other types of bearings are contemplated as well.

As illustrated in FIG. 5, the hub 160 and ground engaging member 104 may define a load centerline 198 that extends perpendicular along the vertical direction V. As described above, with respect to FIG. 3, the load centerline 198 may define a horizontal center of the respective hub 160 and respective ground engaging member 104 along the horizontal direction H. The load centerline 198 may be used as a reference point in describing various locations of different components of the axle assembly 180. It should also be appreciated that the load centerline 198 may define a center of gravity of the hub 160 and ground engaging member 104 (i.e. the hub and tire assembly).

With respect to the aspect of FIG. 5, the at least one bearing 192 may define an annulus, or ring-shape that surrounds a portion of the housing 182a or a portion of the wheel bearing hub 190. As well, the at least one bearing 192 may be horizontally fixed via a respective preload member 170 that is mechanically coupled to the external surface 186a of the housing 182a or the external surface of the wheel bearing hub 190.

In another aspect of the disclosure, various components of the axle assemblies 102, 180 (FIG. 2 and FIG. 4) may be arranged and configured at various horizontal and vertical locations. In this regard, several components of axle assemblies 102, 180 may be radially aligned whereby any portion of the components may overlap other components as shown in the cross-sectional views of FIGS. 3 and 5. For example, the at least one bearing 144, 192 may be radially aligned with at least a portion of the respective planetary gear assembly 132. Accordingly, any portion of the ring gear 138, the at least one planet gear 142 and the sun gear 136 may be radially aligned with the at least one bearing 144, 192. As well, other components may also be radially aligned. For example, the planet gear carrier 134 may be radially aligned with the at least one bearing 144, 192 or any other component disclosed. Additionally, when the mechanical fastener 158 is fully engaged into the bolt hole 156, the mechanical fastener 158 may thereby be radially aligned with at least a portion of the at least one bearing 144, 192, the planetary gear assembly 132, and/or any other component disclosed.

Figure 6:
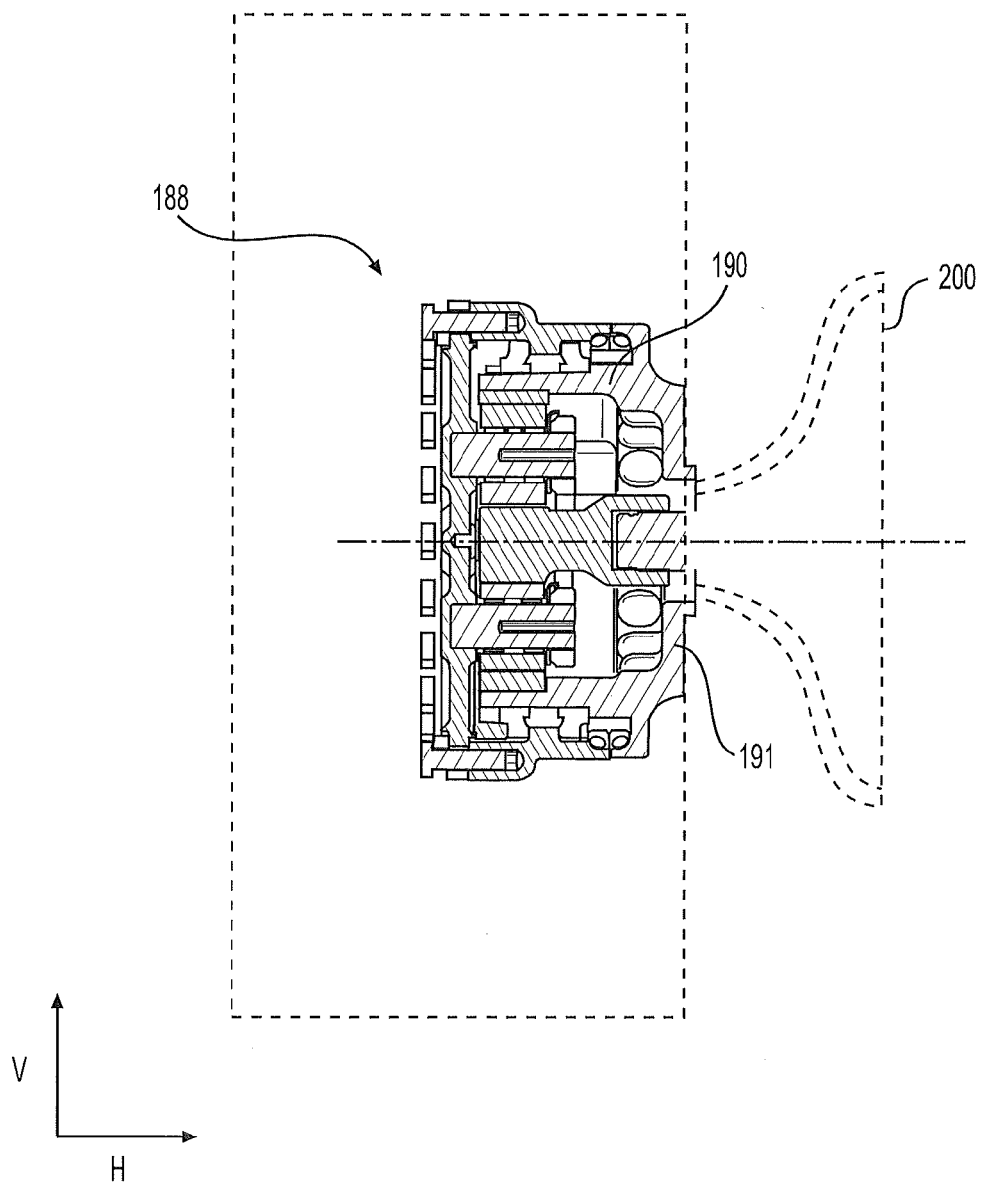
FIG. 6 is a cross-sectional view of a final drive according to another aspect of the disclosure.
Figure 7:
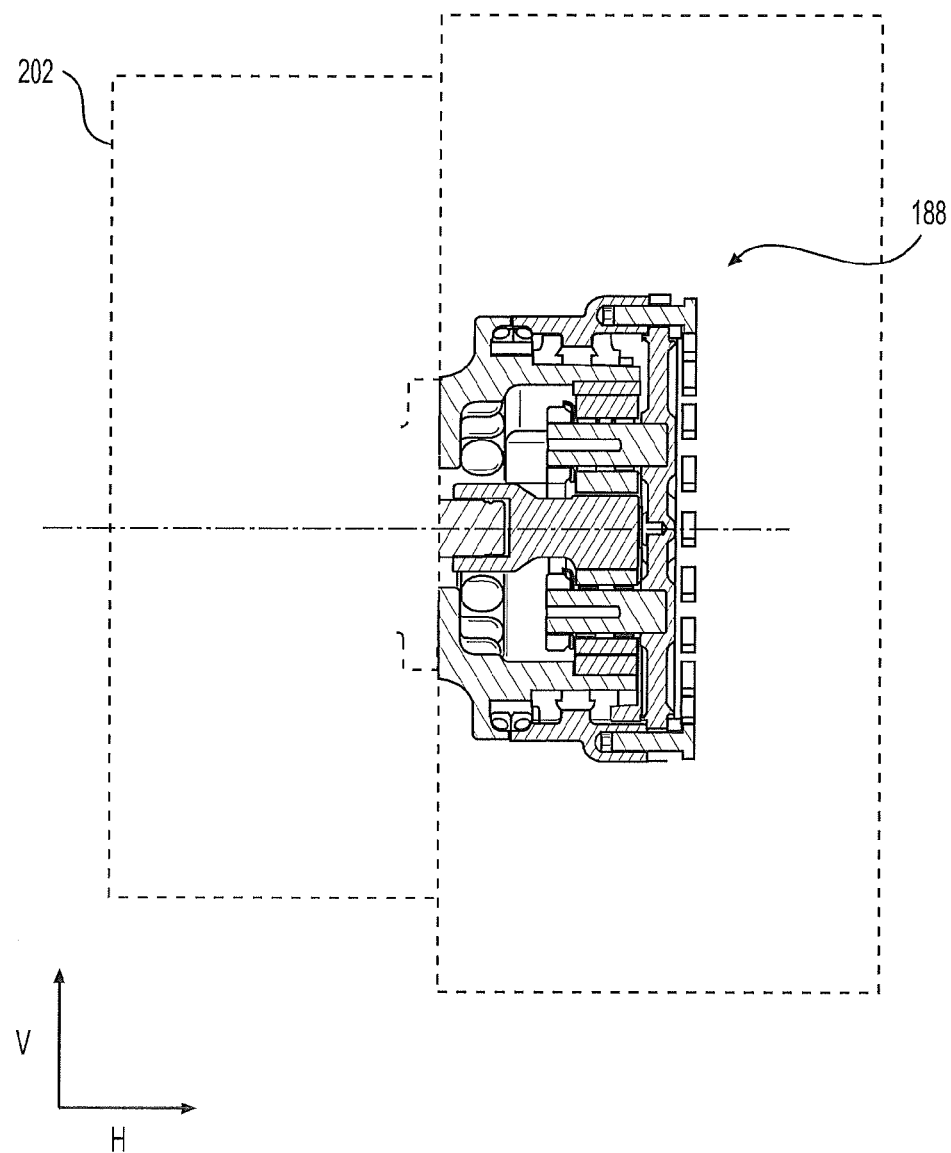
FIG. 7 is a cross-sectional view of a final drive according to another aspect of the disclosure.

FIGS. 6 and 7 illustrate the final drive 188 being coupled to various machines according to a different aspect of the disclosure. As illustrated in FIG. 6, the spindle flange 191 of the wheel bearing hub 190 may be mechanically coupled to a spindle housing 200, such as a fluted spindle housing. In this manner, the axle may include a half axle. In other aspects of the disclosure, the final drive 188 may be mechanically coupled to other assemblies as well. For example, as shown in FIG. 7, the final drive 188 may be mechanically coupled to a frame 202, such as a machine frame. In this regard, the frame 202 may be mechanically coupled to a hydraulic motor, such as a hystat machine (not shown). Generally, the final drive 188 may be implemented in any number of machines, such as an off-road vehicle, track machine, and the like. It should also be appreciated that the final drive 188 may also be referred to as a high-density final drive.

Figure 8:
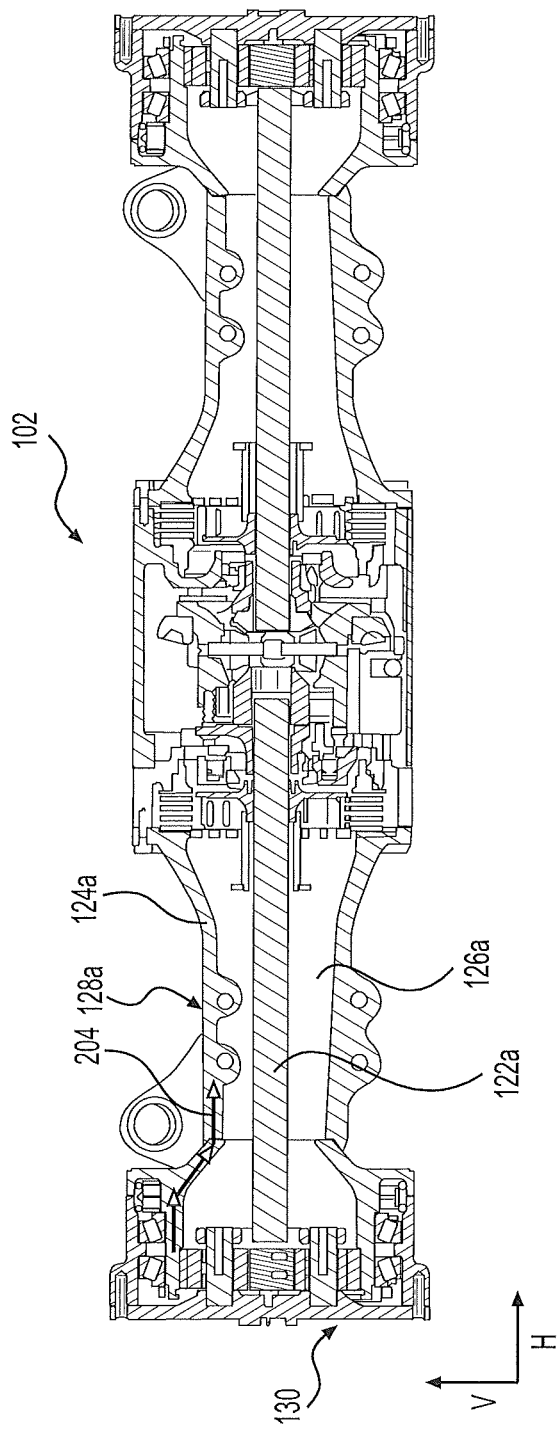
FIG. 8 is a cross-sectional view of an axle assembly illustrating a reaction path according to an aspect of the disclosure.
Figure 9:
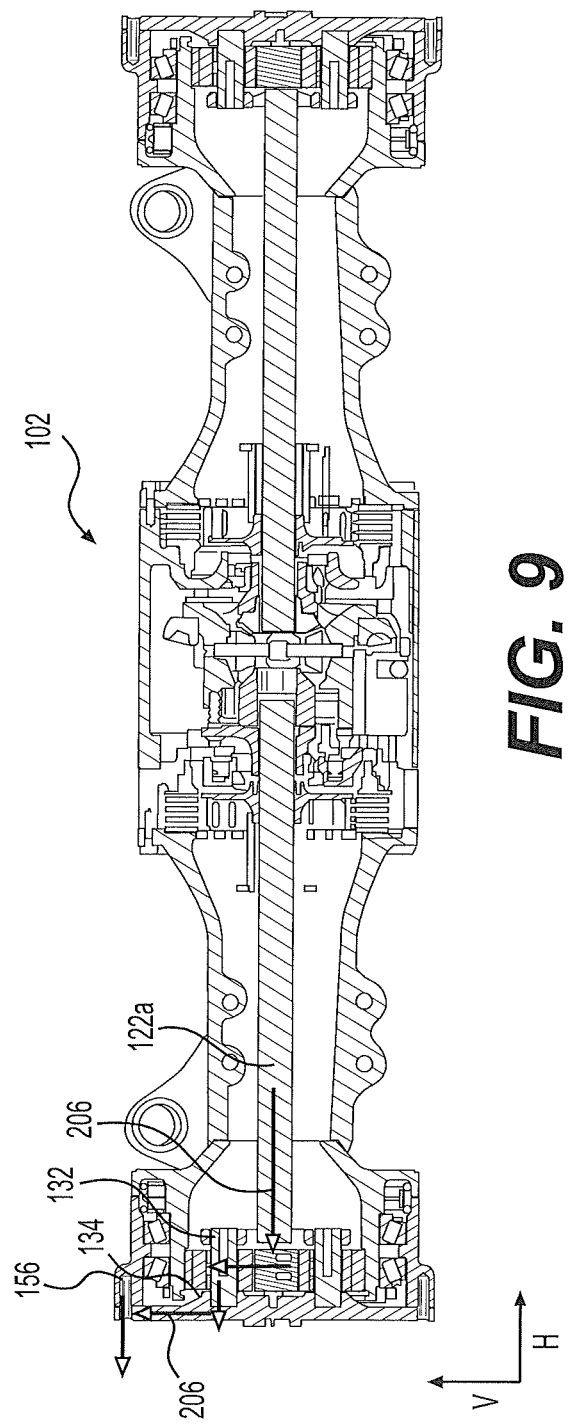
FIG. 9 is a cross-sectional view of an axle assembly illustrating a torque path according to an aspect of the disclosure.

Now, with reference to FIGS. 8 and 9, the torque and/or reaction path from the axle 122a and the ring gear 138 is illustrated. As shown in FIG. 8, torque from the ring gear 138 may be experienced in the axle assembly 102 as a reaction path 204 that travels from the ring gear 138 along the internal surface of bore 126a in a direction toward an inner portion of the axle assembly 102. The axle assembly 102 may be arranged and configured such that the reaction path 204 travels through larger diameters of the housing 124a. As such, this may result in lower structural stresses on the axle assembly 102. Moreover, the reaction path 204 may define a more direct torque path as compared to torque paths of prior art systems.

As illustrated in FIG. 9, the axle assembly 102 may experience torque from the axle 122a as shown by the torque path 206, which travels from the axle 122a towards an outer portion of the axle assembly 102. The torque path 206 may travel from the axle 122a radially outward through the planetary gear assembly 132. Furthermore, the torque path 206 may travel from the planetary gear assembly 132 along a horizontal direction towards the planet gear carrier 134. From the planet gear carrier 134 the torque path 206 may travel radially outward toward the bolt hole 156. The torque path 206 may travel horizontally through the bolt hole 156 away from the inner portion of the axle assembly 102. As such, the torque path 206 may be more direct than torque paths of prior art systems.

INDUSTRIAL APPLICABILITY

This disclosure is applicable to axle assemblies on machines, and more specifically to axle assemblies having planetary gears and wheel bearings. Examples include, but are not limited to off-road vehicles, track-driven machines, earth-moving machines, wheel loaders, dump trucks, material handlers, garbage trucks, and the like.

During operation, the axle assemblies 102, 180 may receive torque from a torque source such as a combustion engine via a differential 120. The axle assemblies 102, 180 may convert the torque into rotation of the axles 122a, 122b to thereby rotate the respective final drives 130, 188 and respective ground engaging members 104, which may cause the vehicle 100 to move. Described in more detail and with reference to FIGS. 2 and 4, the axle assemblies 102, 180 may include two half axles. Because the drive shaft may be arranged non-collinear (e.g. perpendicular) to the axle 122a, 122b, the axle assemblies 102, 180 may also include a universal joint coupled between the two half axles. The universal joint may be capable of transmitting rotation from the differential 120 to another non-collinear shaft, such as the axles 122a, 122b. Furthermore, the axle assemblies 102, 180 may include additional components, such as a differential, which may permit a half axle to rotate at a higher rate than the other half axle.

Furthermore, the axle assemblies 102, 180 may define an overall shorter width as compared to prior art axle assemblies. As well, the axle assemblies 102, 180 may be arranged and configured such that the reaction path 204 and the torque path 206 travel through larger diameters of the housings 124a, 124b, 182a, 182b. Additionally, the reaction path 204 and the torque path 206 may take travel paths that affect few components of the axle assemblies 102, 180. As such, this may result in lower structural stresses on the axle assemblies 102, 180, which may enable manufacturers of the axle assemblies 102, 180 to use lower-cost cast material, less material, fewer components, and/or fewer bolt holes per axle assembly to carry the load.

The axle assemblies 102, 180 disclosed may be implemented into new machines, such as off-road vehicles. As well, the axle assemblies 102, 180 may be used to replace an existing axle assembly already being used on a machine in the field. For example, the axle assemblies 102, 180 may be configured to entirely replace existing axle assemblies on existing machines. In another example, the axle assemblies 102, 180 may be retrofitted to replace only a portion of axle assemblies on existing machines. For example, the wheel bearing hub 190 may be retrofitted to mechanically attach to machines having a spindle housing 200 or a frame 202. In effect, this may result in cost savings, easier serviceability, and decreased downtime of machines.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

In general, it should be appreciated that the teachings of this disclosure can find industrial applicability in any number of machines. In other words, the teachings of this disclosure can be applied to any machine having an axle assembly, such as a front axle assembly or a rear axle assembly. Further, it is to be understood that the teachings of this disclosure could be used with any type of machine or vehicle that performs an operation in various industries such as mining, construction, farming, transportation, or any other industry. For example, the axle assembly of this disclosure can be used as one or more axles for an off-road vehicle, track-driven machine, earth-moving machine, wheel loader, dump truck, material handler, garbage truck, and the like.

I claim:

1. An axle assembly comprising:
   a housing having a bore and an external surface facing opposite the bore;
   an axle elongated along a horizontal direction and rotatably received within the bore, wherein the axle is rotatable about an axis and rotatable relative to the housing;
   a planetary gear assembly having a ring gear mechanically coupled to the bore, a sun gear mechanically coupled to the axle, and at least one planet gear rotatably coupled to the sun gear and rotatably received by the ring gear such that the at least one planet gear rotates about the sun gear and rotates within the ring gear, wherein the planetary gear assembly multiplies torque from the axle to a planet gear carrier rotatably coupled to the at least one planet gear such that the planet gear carrier rotates about the axis;
   at least one bearing mechanically coupled to the external surface of the housing;
   a wheel rotatably supported by the at least one bearing such that the wheel rotates about the axis;
   a rim flange mechanically coupled to the wheel, wherein the rim flange rotates about the axis; and
   a hub mechanically coupled to the rim flange and rotatable about the axis, wherein the hub defines a load centerline that extends perpendicular to the axis, wherein the load centerline defines a center of the hub along the axis.

2. The axle assembly of claim 1, wherein the at least one bearing is radially aligned with the planetary gear assembly.

3. The axle assembly of claim 2, wherein the wheel is mechanically coupled to the planet gear carrier.

4. The axle assembly of claim 1, further comprising a seal sealably coupled to the external surface of the housing, whereby the seal is disposed between the external surface of the housing and an internal portion of the wheel.

5. The axle assembly of claim 1, wherein the at least one bearing comprises a first bearing and a second bearing spaced apart along the horizontal direction, the axle assembly further comprising a preload member mechanically coupled to the external surface of the housing and coupled adjacent to an outer surface of the first bearing, wherein the preload member establishes a horizontal load on the first and second bearings.

6. A vehicle having a final drive, the final drive comprising:
   a housing having a bore and an external surface facing opposite the bore;
   an axle elongated along a horizontal direction and rotatably received within the bore, wherein the axle defines a distal end, and wherein the axle is rotatable about an axis and rotatable relative to the housing;
   a planetary gear assembly mechanically coupled to the distal end of the axle, wherein the planetary gear assembly multiplies torque from the axle to a planet gear carrier rotatably coupled to the planetary gear assembly such that the planet gear carrier rotates about the axis;
   a first bearing and a second bearing, wherein the first and second bearings are mechanically coupled to the external surface of the housing;
   a wheel mechanically coupled to the planet gear carrier and rotatably coupled to the first and second bearings such that the wheel rotates about the axis;
   a rim flange mechanically coupled to the wheel, wherein the rim flange rotates about the axis; and
   a hub mechanically coupled to the rim flange and rotatable about the axis, wherein the hub defines a load centerline that extends perpendicular to the axis, wherein the load centerline defines a center of the hub along the axis, and the load centerline separates an inner horizontal side from an outer horizontal side.

7. The vehicle of claim 6, wherein the first and second bearings are located within a same side as the inner horizontal side.

8. The vehicle of claim 6, wherein the planetary gear assembly and the planet gear carrier are located within a same side as the inner horizontal side.

9. The vehicle of claim 6, wherein the housing and the distal end of the axle are located within a same side as the inner horizontal side.

* * * * *